United States Patent [19]

Bates et al.

[11] 4,339,050

[45] Jul. 13, 1982

[54] LOUVRE BUFFER FIRE PREVENTION SYSTEM

[75] Inventors: Jack R. Bates, Ridgecrest; William E. Collier, Jr., China Lake, both of Calif.

[73] Assignee: The United States of America as represented by the Secretary of the Navy, Washington, D.C.

[21] Appl. No.: 203,012

[22] Filed: Nov. 3, 1980

[51] Int. Cl.³ ............................................ B65D 25/34
[52] U.S. Cl. ................................. 220/437; 220/88 R; 220/900; 244/135 R; 428/912
[58] Field of Search ............... 428/411, 412; 220/900, 220/88 R, 435, 448, 437, 439; 109/82, 80; 244/135 R, 135 B

[56] References Cited

U.S. PATENT DOCUMENTS

| | | | |
|---|---|---|---|
| 1,436,985 | 11/1922 | Friant | 220/900 X |
| 2,404,418 | 7/1946 | Walker | 220/88 |
| 2,733,177 | 1/1956 | Meyer | 428/911 X |
| 2,771,384 | 11/1956 | Collins | 428/911 |
| 2,779,702 | 1/1957 | Wilson et al. | 220/900 X |
| 3,256,130 | 6/1966 | Nisbet et al. | 428/911 X |
| 3,438,430 | 4/1969 | Kestemont | 220/437 X |
| 3,698,597 | 10/1972 | Burke | 220/86 |
| 3,723,231 | 3/1973 | Clay et al. | 220/448 X |
| 3,924,773 | 12/1975 | Wilkinson | 220/88 B |
| 4,121,666 | 10/1978 | Rozniecki | 169/62 |
| 4,141,460 | 2/1979 | Stanistreet et al. | 220/88 |

FOREIGN PATENT DOCUMENTS

| | | | |
|---|---|---|---|
| 825348 | 3/1938 | France | 220/900 |
| 110699 | 7/1925 | Switzerland | 109/80 |

Primary Examiner—Allan N. Shoap
Attorney, Agent, or Firm—Robert F. Beers; W. Thom Skeer; Kenneth G. Pritchard

[57] ABSTRACT

A composite or metal baffel system around a fuel tank collapses after puncture from an explosive round. The collapse is caused by the overpressure that follows penetration. The collapse delays fuel leakage until the incendiary effect of the explosive round is passed. The delay of fuel leakage is caused by the time it takes for fuel to follow a serpentine path through the collapsed baffel system.

6 Claims, 2 Drawing Figures

LOUVRE BUFFER FIRE PREVENTION SYSTEM

BACKGROUND OF THE INVENTION

1. Field of the Invention

The present invention pertains to fire prevention systems for fuel tanks. In particular the present invention pertains to fire prevention systems for aircraft fuel tanks which are subject to penetration by high explosive incendiary projectiles or high velocity fragments.

2. Description of the Prior Art

Numerous military vehicles have a high vulnerability to penetration of their fuel tanks. The equipment bays or void spaces around and under fuel tanks, such as on aircraft, are vulnerable to fires if hit by high explosive incendiary projectiles, HEI. Such projectiles, penetrate the outer skin of the aircraft. This penetration triggers a fuse which detonates the projectiles explosive charge a short time later, usually a few microseconds. The projectile fragments into smaller pieces which are expelled at high velocities followed by the development of an incendiary fireball.

The fragments penetrate the fuel tank and fuel is expelled into the area where the incendiary fire is developing and is ignited. In order to prevent a fuel fire, all that is required is that no fuel be expelled for approximately ten milliseconds, which is the average duration of the incendiary fire.

Due to weight constraints on combat aircraft, any system for vulnerability reduction must be very lightweight and require little if any maintenance. Systems presently in use on aircraft are either complex fire sensing and extinguishing systems which are heavy and expensive or are systems which employ a foam buffer which has not been proven to have high reliability. Numerous examples of buffer systems around fuel tanks can be found in U.S. Pat. Nos. 3,698,597 to Burke, 3,924,773 to Wilkinson, 4,121,666 to Rozniecki, and 4,141,460 to Stanistreet et al. All of these patents can be considered considerable state-of-the-art advances over U.S. Pat. No. 2,404,418 to Walker. The Walker patent uses a rubber liner to protect fuel tanks punctured by bullets. The Walker patent uses pressurized containers within rubber liners to slow the fuel retardant forces. Collapse causes nonalignment of the punctures in the rubber liner and the fuel tank wall itself. However, as stated in the Walker patent, bullets are assumed to make sharp clean holes through the metal walls. Modern high explosive incendiaries produce jagged fragments which do not produce the same type of clean holes described in Walker. Such fragments literally shread a rubber liner. The Walker device is not suitable for aircraft because it takes up too much space needed for fuel and adds excessive weight.

SUMMARY OF THE INVENTION

Due to weight constraints on aircraft, a lightweight system for vulnerability reduction is provided by a louvred buffer system. Louvres are made of either thin metal, such as aluminum, or composite materials such as fiberglass compounds or epoxy-fiber material. The louvres are spaced in sufficient proximity, such that upon over pressure on one side of the louvres a rigid cover over the louvres provides a pressure surface area which collapses the louvres in such a manner as to cause considerable overlap. Fragment paths prior to the collapse will puncture through the louvres and into the fuel tank along straight paths. After collapse, fuel will have to leak from the fuel tank along the serpentine route of collapsed material which will be time consuming. During this time the blast and resultant fireball from HEI will have dissipated. Fuel leakage after removal of the fireball is of minor threat to the aircraft compared to the combustion of leaking fuel.

Accordingly, it is an object of the present invention to create a fire prevention system which retards fuel leakage from ruptured fuel tanks until such time as the incendiary effects from modern weaponry have passed.

DESCRIPTION OF THE PREFERRED EMBODIMENT

Figure 1:
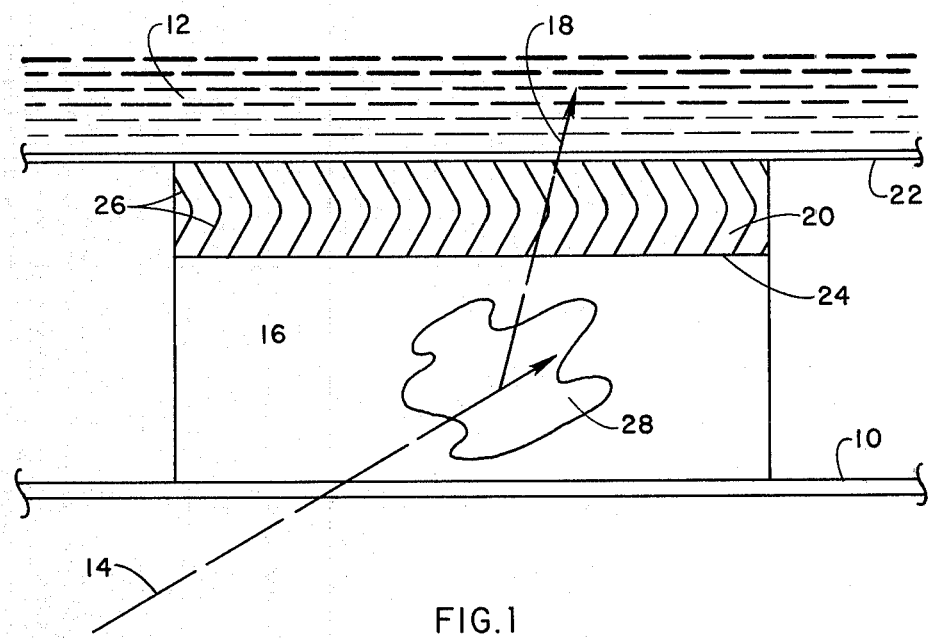
FIG. 1 is a side profile view of an HEI projectile rupturing a fuel tank through the present invention.

FIG. 1 shows the external skin 10 of an aircraft or other vehicle containing a fuel tank 12. The projectile ruptures skin 10 along path 14. The projectile carries a fuse which is triggered by the rupture of skin 10 and detonates the projectiles explosive charge in the general vicinity 16 between aircraft skin 10 and fuel tank 12. Projectile fragments travel along paths such as 18 which pass through a louvre buffer system 20 and rupture the external wall 22 to fuel tank 12. Louvre buffer system 20 comprises a rigid cover 24 and a plurality of louvres 26. Shortly after the fuse detonates, fragmentary pieces travel along paths such as 18. Development of the incendiary fireball is represented by cloud 28. Blast overpressure due to incendiary fireball 28 hits louvre system 20 and compresses rigid cover 24 against individual louvres 26 flattening them against wall 22 of fuel tank 12 which is a rigid structure.

Figure 2:
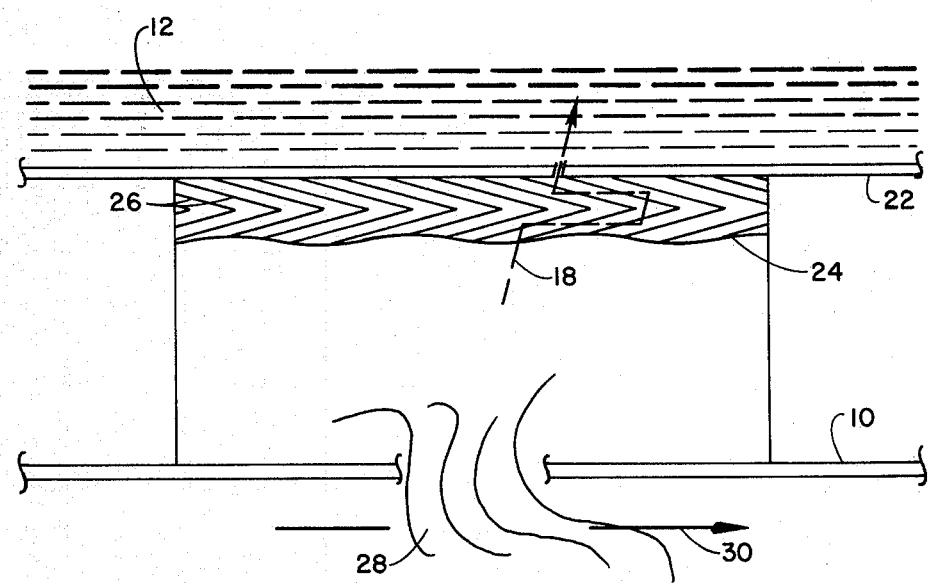
FIG. 2 is a cross-sectional view of the retradant effect of fuel leakage of the present invention.

As louvres 26 are compressed, holes in the various surfaces move relative to each other as shown in FIG. 2. Original fragmentary path 18 is now seen to be a serpentine configuration through compressed louvres 26. The movement of the surfaces relative to each other obscures the direct path for fuel to escape from tank 12. The time taken for the blast wave to compress the louvres 26 and then to subside is longer than the duration of the incendiary fire. By the time fuel is able to leak along the serpentine path caused by compression of louvre buffer system 20, the system no longer has a source for fire because fireball 28 has been dissipated and/or swept away by airflow as represented by arrow 30. Louvres 26 are not required to stay collapsed longer than the time delay needed to permit termination of the fireball.

Louvres 26 may be made of either a thin metal such as aluminum or composite material such as a fiberglass composite or an epoxy-fiber compound. All of these materials will permit louvre system 20 to be of light weight so that minimum weight problems will be added to an aircraft. Rigid cover 24 can be made of the same material as louvres 26. Cover 24 must be placed over the louvres to provide a pressure surface area to cause collapse of the louvres from overpressure. The louvres 26 can be mounted against fuel tank 12 by being glued to external wall 22 in any well known bonding way. An example that can be used is an epoxy bond. In a similar fashion, cover 24 can be glued through epoxy bonds to the individual louvres 26.

FIG. 1 of the present invention shows louvres 26 configured as a series of V's. Other configurations are possible subject to the requirement that advanced calculations are made to insure that upon collapse of louvres 26 there is sufficient overlap among louvres to insure that ballistic paths of the fragments will be unable to trace a direct path for escaping fuel.

It is obvious to those skilled in the art that numerous variations to the above invention can be made.

What is claimed is:

1. A fire prevention system for fuel tanks ruptured by explosive incendiary projectiles comprising:
    a collapsible plurality of louvres mounted to the outside of said fuel tank by epoxy bonding, said louvres being shaped to have a predetermined overlap with adjacent louvres, said louvres having a non-collapsed configuration prior to the explosion of said explosive incendiary projectile and a collapsed configuration caused by the explosion of said explosive incendiary projectile, such that any straight line path through the uncollapsed configuration is disrupted by the collapsed configuration; and
    a cover placed over said louvres on the opposite side of said louvres from said fuel tank, said cover forming a pressure surface that collapses with the collapsible louvres if a predetermined pressure occurs on the opposite side of said cover from said louvres.

2. A fire prevention system for fuel tanks ruptured by explosive incendiary projectiles as described in claim 1 where said plurality of louvres and said cover are made of a composite material.

3. A fire prevention system for fuel tanks ruptured by explosive incendiary projectiles as described in claim 1 where said plurality of louvres and said cover are made of epoxy-fiber material.

4. A fire prevention system for fuel tanks ruptured by explosive incendiary projectiles as described in claim 1 where said plurality of louvres and said cover are made of metal.

5. A fire prevention system for fuel tanks ruptured by explosive incendiary projectiles as described in any of claims 1, 2, 3, or 4 where said cover is epoxy bonded to said plurality of louvres.

6. A fire prevention system for fuel tanks ruptured by explosive incendiary projectiles as described in claim 5 where each of said louvres is V shaped, said V oriented so that the end of one leg of the V is attached to the outside of the fuel tank and the end of the other leg is attached to the cover such that any line passing through both the cover and the fuel tank passes through both sides of the V, and spaced from adjacent V louvres such that when the louvres are in the collapsed configuration the Vs overlap.

* * * * *